United States Patent
Overgaard

(10) Patent No.: US 8,828,172 B2
(45) Date of Patent: Sep. 9, 2014

(54) METHOD FOR MANUFACTURING A WIND TURBINE ROTOR BLADE WITH A SHEAR WEB

(75) Inventor: Anders Overgaard, Frederikshavn (DK)

(73) Assignee: Siemens Aktiengesellschaft, Munich (DE)

( * ) Notice: Subject to any disclaimer, the term of this patent is extended or adjusted under 35 U.S.C. 154(b) by 44 days.

(21) Appl. No.: 13/610,955

(22) Filed: Sep. 12, 2012

(65) Prior Publication Data

US 2013/0068389 A1    Mar. 21, 2013

(30) Foreign Application Priority Data

Sep. 15, 2011    (EP) ..................... 11181340

(51) Int. Cl.
  *C09J 5/00*    (2006.01)
  *B29C 70/34*    (2006.01)
  *F03D 1/06*    (2006.01)
  *B29L 31/08*    (2006.01)

(52) U.S. Cl.
  CPC ............... *B29C 70/34* (2013.01); *Y02E 10/721* (2013.01); *B29L 2031/082* (2013.01); *F03D 1/0675* (2013.01); *B29L 2031/085* (2013.01)
  USPC .......................................... 156/245; 156/324

(58) Field of Classification Search
  USPC .......................................................... 156/245
  See application file for complete search history.

(56) References Cited

U.S. PATENT DOCUMENTS

| 2003/0116262 | A1* | 6/2003 | Stiesdal et al. ................. 156/245 |
| 2010/0273378 | A1* | 10/2010 | Palinsky et al. .................. 442/59 |
| 2011/0262283 | A1* | 10/2011 | Hancock et al. .............. 416/226 |

FOREIGN PATENT DOCUMENTS

| EP | 1310351 A1 | 5/2003 |
| NL | 8800301 A | 2/1988 |
| WO | WO 2009153342 A2 * | 12/2009 |

* cited by examiner

*Primary Examiner* — Philip Tucker
*Assistant Examiner* — Vicki Wu

(57) ABSTRACT

A method for manufacturing a wind turbine rotor blade with a shear web involves the following steps: Fiber material is laid onto the inner surface of a mold. A first layer of fiber material for the shear web is laid onto the fiber material which was placed onto the inner surface of the mold. Then a first mold core part is partly positioned onto the first layer of fiber material. The first mold core part has a base surface, a top surface and a surface for supporting the shear web. The first layer of fiber material is then placed along the surface for supporting the shear web and at least partly along the top surface of the first mold core part. Then the shear web is positioned at the surface of supporting the shear web of the first mold core part.

14 Claims, 4 Drawing Sheets

METHOD FOR MANUFACTURING A WIND TURBINE ROTOR BLADE WITH A SHEAR WEB

CROSS REFERENCE TO RELATED APPLICATIONS

This application claims priority of European Patent Office application No. 11181340.8 EP filed Sep. 15, 2011. All of the applications are incorporated by reference herein in their entirety.

FIELD OF INVENTION

The illustrated embodiments relate to a method for manufacturing a wind turbine rotor blade with a shear web. The method is related to an improved placing of the web of a wind turbine rotor blade.

BACKGROUND OF INVENTION

There are various ways of manufacturing a wind turbine rotor blade. For example, in EP 1 310 351 A1 a method for making a windmill blade is disclosed, whereby problems with glue joints and with exposure of the workers to environmentally hazardous substances are avoided. In FIG. 6 of EP 1 310 351 A1 two parts of a mould core are placed on an inner layer of fibre material. A shear web is placed between the two parts of the mould core. On both sides of the shear web fibre material can be placed. The fibre material may be placed around the shear web and to some extent across the inner layer of fibre material as well as across the core part.

For one embodiment of the manufacturing method, the web and the glass fibre surrounding it is build up on a position remote to the mould and then subsequently lifted to its position in the mould.

In order to decrease the weight of the blades, PET-foam (PET: polyethylene terephthalate) can be used as web material. However this requires—as the packing procedure of the fibre material is done today—that the web has to carry the weight of the glass fibre material until it is placed in the mould as described above. However the use of PET-foam induces deformations in the casted web as its mechanical properties are different to plywood such as it has a lesser stiffness and therefore deforms under the weight of the fibre material.

SUMMARY OF INVENTION

It is desirable to provide an improved method for manufacturing a wind turbine rotor blade with a shear web.

The above is met by the features of the independent claim (s). The depending claims define further developments.

The illustrated method for manufacturing a wind turbine rotor blade with a shear web comprises the following steps: Fibre material is laid onto the inner surface of a mould. At least one first layer of fibre material for the shear web is laid onto the fibre material which was placed onto the inner surface of the mould. Then a first mould core part is partly positioned onto the at least one first layer of fibre material for the shear web. The first mould core part comprises a base surface, a top surface and a surface for supporting the shear web. The at least one first layer of fibre material for the shear web is then placed along the surface for supporting the shear web and at least partly along the top surface of the first mould core part. Then the shear web is positioned at the surface of supporting the shear web of the first mould core part. The shear web comprises a first surface and a second surface. The shear web is positioned at a surface for supporting the shear web of the first mould core part such that the first surface of the shear web faces the fibre material at the surface for supporting the shear web.

A second layer of fibre material for the shear web is laid onto the fibre material which was placed onto the inner surface of the mould, along the second surface of the shear web and at least partly along the top surface of the first mould core part. Then a second mould core part is positioned partly onto the at least one second layer of fibre material for the shear web. The second mould core part comprises a base surface, a top surface and a surface for supporting the shear web. The second mould core part is positioned onto the at least one second layer of fibre material for the shear web such that the base surface is facing the second layer of fibre material for the shear web and the surface for supporting the shear web is facing towards the second surface of the shear web. Finally, part of the second layer of fibre material for the shear web is placed onto the top surface of the second mould core part.

The illustrated method provides that the web material can be chosen freely independent of its capability to carry the fibre material. Moreover, it allows for the possibility of designing various web constructions. Furthermore, space in the production facilities can be saved as no room is needed for the parallel and separate construction of the shear web and the fibre material surrounding it. Moreover, the method minimises the risked of wrinkles and deformities in the web layers in the lower mould part as the weight from this web "package" is much less than known from prior art, as it is from only the web itself and not from additional fibre material surrounding the web. Furthermore, the heavy web and glass fibre does not need to be lifted by crane from a remote position to the mould. This induces fewer hazards and spends less crane-hour. Furthermore, no specific arrangements are needed to support the web with the supporting fibre material in correct position once placed in the mould. The web can be packed with fibre material forth running as the web is installed in the supporting members and/or in the lower mould part. This in turn saves manufacturing time.

In the context of the illustrated method a shear web comprising plastic material, for example polyethylene terephthalate (PET) foam, can be used. This reduces the weight of the wind turbine rotor blade. The used fibre material may comprise glass fibre material and/or carbon fibre material.

The used shear web may comprise at least one supporting member, for example, two supporting members. For example, the used shear web can comprise a base surface and a top surface. The supporting member can be located at the base surface or at the top surface of the shear web. The shear web may comprise a first supporting member which is located at the base surface and a second supporting member which is located at the top surface.

The used shear web may further comprise at least one opening or hole. The at least one opening or hole can be located in the first surface and in the second surface, In other words, the opening or hole may connect the first surface with the second surface. This means, that the at least one opening or hole may proceed from the first to the second surface.

The at least one opening or hole may have a circular cross section or a cross section with the shape of a polygon with n edges. For example, the opening may have a triangular or rectangular or trapezoidal or pentagonal or hexagonal cross section. By providing the shear web with openings or holes, the weight of the web and thereby the weight of the whole rotor blade can be minimized.

Generally, a none-solid web material can be used. This reduces the weight of the web and thereby the weight of the whole rotor blade.

A first web supporting member can be positioned onto the fibre material which was placed onto the inner surface of the mould before laying the at least one first layer of fibre material the shear web onto the fibre material which was placed onto the inner surface of the mould. Moreover, a second web supporting member can be positioned after placing part of the second layer of fibre material for the shear web onto the top surface of the second mould core part. The use of web supporting members increases the stability of the connection between the shear web and the outer shell of the wind turbine rotor blade. It further simplifies the correct and precise positioning of the shear web in the mould.

The aspects defined above and further aspects are apparent from the examples of embodiment to be described hereinafter and are explained with reference to the examples of embodiment.

BRIEF DESCRIPTION OF THE DRAWINGS

Further features, properties and advantages of the illustrated embodiments will become clear from the following description in conjunction with the accompanying drawings. All features are advantageous separate or in combination with each other.

DETAILED DESCRIPTION OF INVENTION

Figure 1:
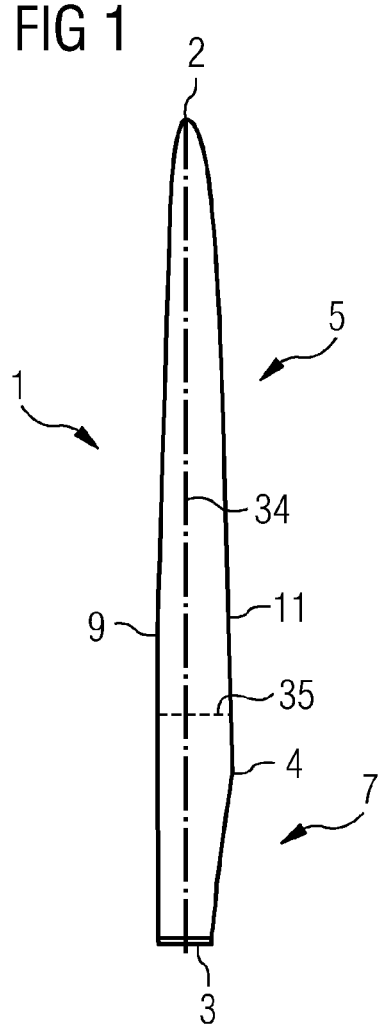
FIG. 1 schematically shows a rotor blade in a plan view on the plane defined by the blade's span and the blade's chord.

An embodiment will now be described with reference to FIGS. 1 to 9. FIG. 1 shows a rotor blade in a plan view on the plane defined by the blade's span 34 and the blade's chord 35. FIG. 1 shows a wind turbine blade 1 as it is usually used in a three-blade rotor. However, the present technique shall not be limited to blades for three-blade rotors. In fact, it may as well be implemented in other rotors, e.g. one-blade rotors or two-blade rotors.

The rotor blade 1 shown in FIG. 1 comprises a root portion 3 with a cylindrical profile and a tip 2. The tip forms the outermost part of the blade. The cylindrical profile of the root portion 3 serves to fix the blade to a bearing of a rotor hub. The rotor blade 1 further comprises a so-called shoulder 4 which is defined as the location of its maximum profile depth, i.e. the maximum chord length of the blade. Between the shoulder 4 and the tip 2 an airfoil portion 5 extends which has an aerodynamically shaped profile. Between the shoulder 4 and the cylindrical root portion 3, a transition portion 7 extends in which a transition takes place from the aerodynamic profile of the airfoil portion 5 to the cylindrical profile of the root portion 3.

Figure 2:
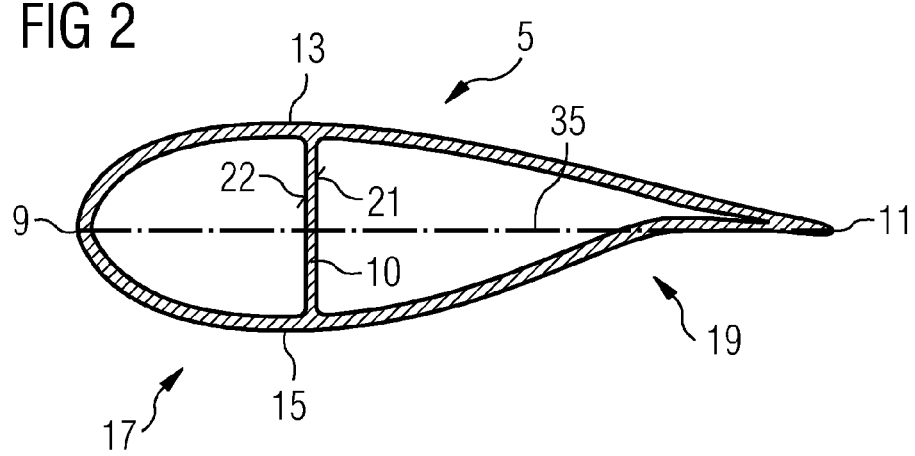
FIG. 2 schematically shows a chord-wise cross section through the rotor blade's airfoil section.

A chord-wise cross section through the rotor blade's airfoil section 5 is shown in FIG. 2. Their aerodynamic profile shown in FIG. 2 comprises a convex suction side 13 and a less convex pressure side 15. The dash-dotted line extending from the blade's leading edge 9 to its trailing edge 11 shows the chord of the profile. Although the pressure side 15 comprises a convex section 17 and a concave section 19 in FIG. 2, it may also be implemented without a concave section at all as long as the suction side 13 is more convex than the pressure side 15.

The suction side 13 and the pressure side 15 in the airfoil portion 5 will also be referred to as the suction side and the pressure side of the rotor blade 1, respectively, although, strictly spoken, the cylindrical portion 3 of the blade 1 does not show a pressure or a suction side.

At first the method manufacturing a wind turbine rotor blade by vacuum assistant resin transfer moulding (VARTM) will be described. This well known method comprises the following steps: A number of layers of fibre material are placed in a first mould part. Then a number of core parts and at least one shear web are placed in the first mould part. Then, a number of layers of fibre material are placed onto the core parts and the shear web. A second mould part can then be placed onto the core parts and the fibre material such that the first mould part or shell and the second mould part or shell are connected to each other forming a closed mould cavity. To inject resin into the closed mould cavity, vacuum is applied to the closed mould cavity and resin is sucked into the space between the mould parts or shells and the core parts. After letting the resin set or curing the resin the mould parts or shells and the core parts can be removed.

Figure 3:
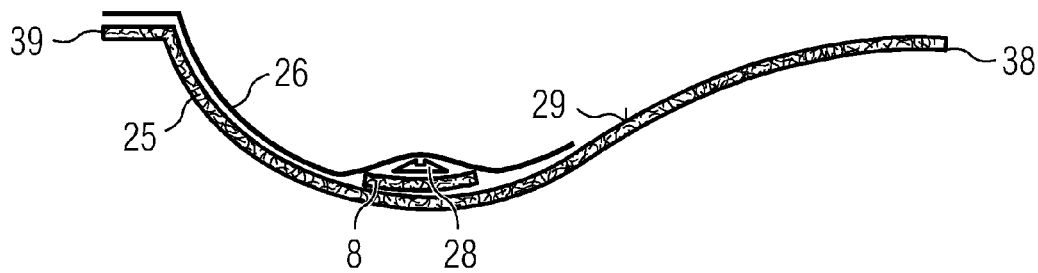
FIG. 3 schematically shows a mould filled with fibre material in a sectional view.

FIG. 3 schematically shows a first mould shell 25 in a sectional view. A number of layers of fibre material are placed onto the inner surface 29 of the mould shell 25. This is not explicitly shown in FIG. 3. The mould shell 25 comprises a leading edge 39 and a trailing edge 38.

A number of layers of web fibre material 8 are laid up onto the fibre material in the mould shell 25. Then, a web supporting member 28 is placed on top. Furthermore, a first layer of fibre material for the shear web 26, for example glass fibre material, is laid up from the leading edge 39 of the mould 25 to the trailing edge 38 of the mould 25. The first layer of fibre material for the shear web 26 extends from the leading edge 39 of the mould 25 towards the trailing edge 38 of the mould 25 at least as far such that it completely covers the web fibre material 8 and the first supporting member 28.

Figure 4:
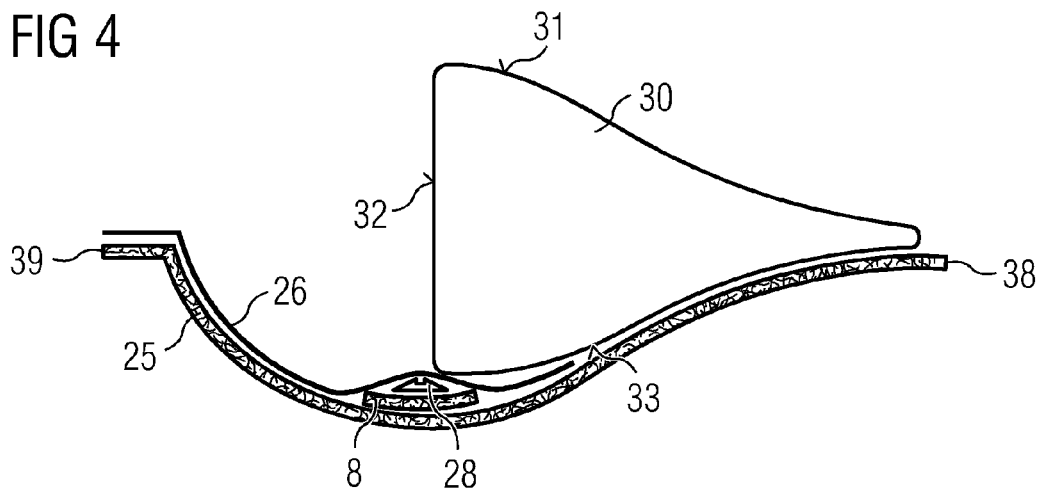
FIG. 4 schematically shows a mould filled with fibre material and a first mould core part.

FIG. 4 schematically shows the mould of FIG. 3 after positioning a first mould core part 30 in a sectional view. The first mould core part 30 comprises a top surface 31, a surface for supporting the shear web 32 and a base surface 33. The first mould core part 30 is positioned onto the first layer of fibre material for the shear web 26 such that the base surface 33 is at least partly placed onto the first layer of fibre material for the shear web 26. The first mould core part 30 placed in position is resting on the first layer of fibre material 26 which thereby is fixated.

Figure 5:
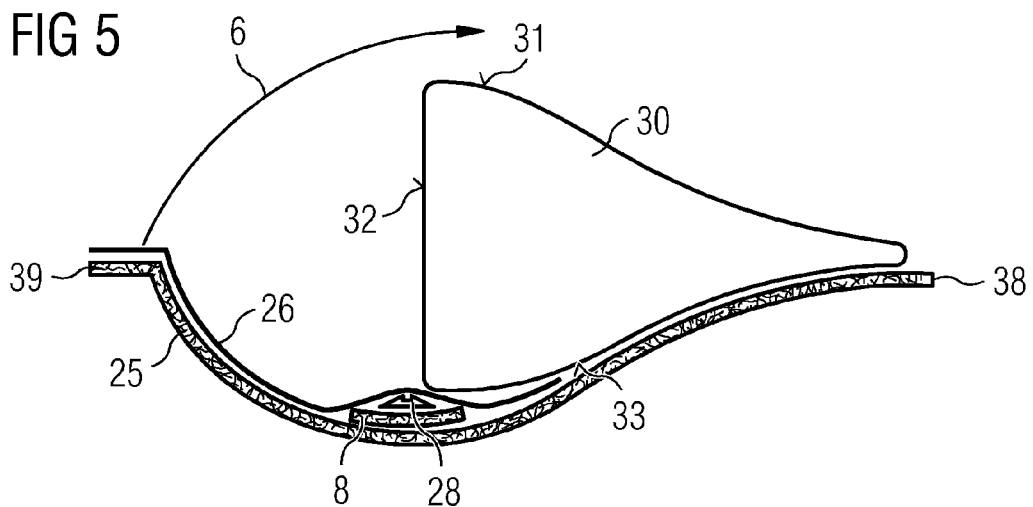
FIG. 5 schematically shows the mould of FIG. 4 during the positioning of a first layer of fibre material.

FIG. 5 schematically shows the positioning of the first layer of fibre material for the shear web 26 along the first mould core part 30 in a sectional view. The said first layer of fibre material 26 is now positioned over the first mould core part 30 in such a way that the web supporting member 28 is exposed. The folding of the first layer of fibre material for the shear web 26 is indicated by an arrow 6. The first layer 26 is removed from the leading edge 39 of the mould shell 25 and is placed along the surface for supporting the shear web 32 and at least partly along the top surface 31 of the first mould core part 30. As result, the first layer 26 lays partly at the base surface 32, completely along the surface for supporting the shear web 32 and partly along the top surface 31 of the mould core part 30.

Figure 6:
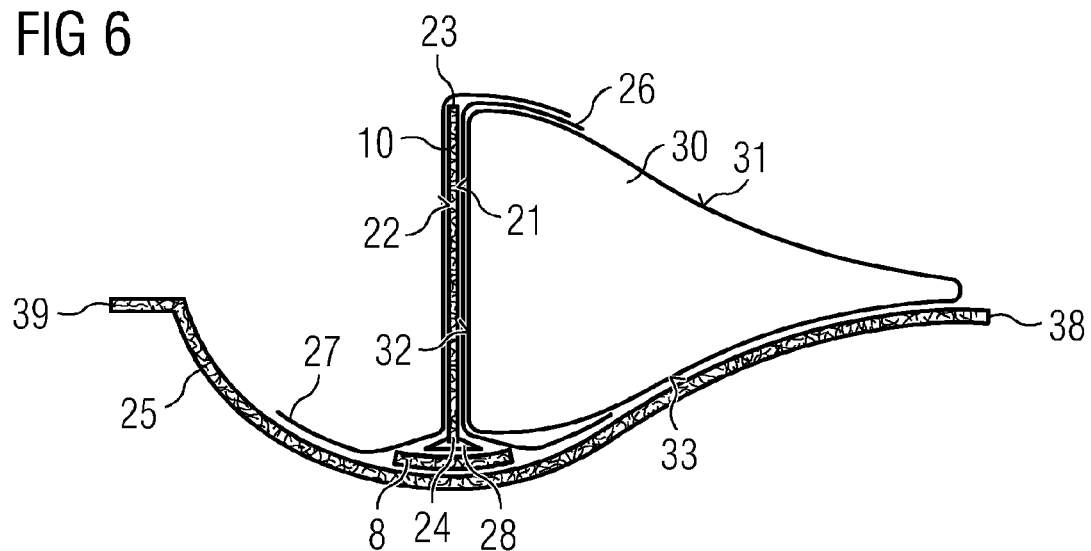
FIG. 6 schematically shows the positioning of a shear web in the mould and the positioning of a second layer of fibre material in a sectional view.

FIG. 6 schematically shows the positioning of a shear web 23 and a second layer of fibre material for the shear web 27 in a sectional view. After folding the first layer of fibre material for the shear web 26 about the first mould core part 30 the shear web 23 itself is positioned and connected to the first supporting member 28. The shear web 23 comprises a first surface 21, a second surface 22, a top surface 23 and a base surface 24. The base surface 24 is injected into a corresponding opening in the first supporting member 28. The first surface 21 of the shear web 10 is laid at the first layer of fibre material for the shear web 26 and faces towards the surface for supporting the shear web 32 of the first mould core part 30.

After positioning the shear web 10 a second layer of fibre material for the shear web 27 is laid at least partly onto the fibre material which is already placed in the mould 25, along the second surface 22 of the shear web, along the top surface 23 of the shear web 10 and at least partly onto the position of the first layer of fibre material for the shear web 26, which was laid onto the top surface 31 of the first mould core part 30. In other words, the second layer of fibre material 27 is laid up along the free side 22 of the shear web 10, over the supporting member 28 and over the mould core part 30.

Figure 7:
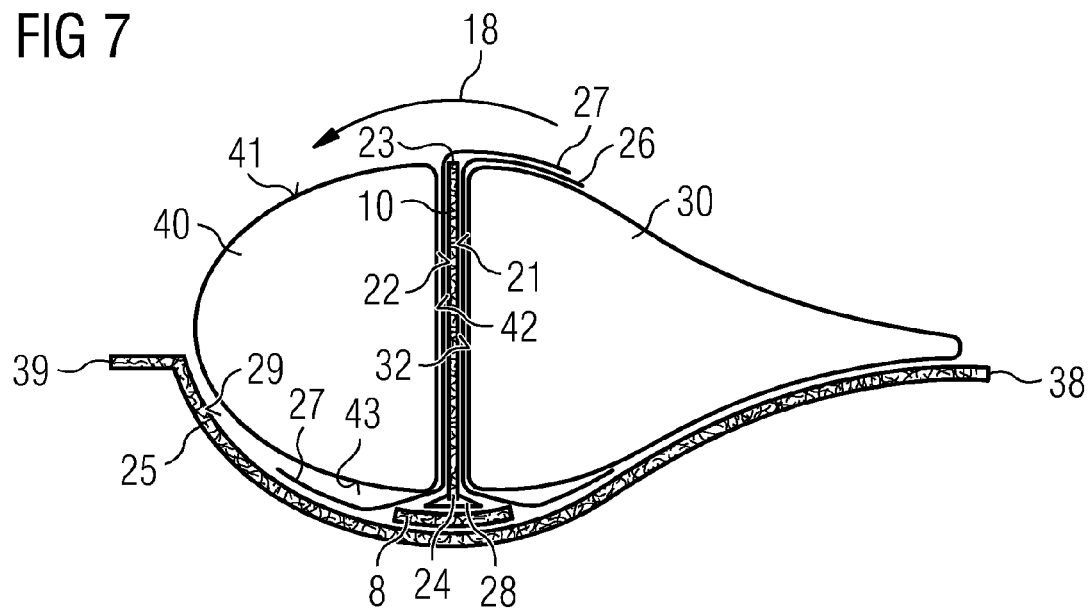
FIG. 7 schematically shows the positioning of the second layer of fibre material in the mould with a second mould core part in a sectional view.

FIG. 7 schematically shows the positioning of a second mould core part and the back folding of the second layer of fibre material for the shear web 27 onto it in a sectional view. The second mould core part 40 comprises a top surface 41, a surface for supporting the shear web 42 and a base surface 43. The second mould core part 40 is now positioned in the mould 25 such that the base surface 43 faces towards the inner surface 29 of the mould 25, the surface for supporting the shear web 42 lays at the second layer of fibre material for the shear web 27 and faces towards the second surface 22 of the shear web 10. In FIG. 7 the base surface 43 of the second mould core part 40 lays at least partly onto the second layer of fibre material for the shear web 27.

Then the position of the second layer of fibre material for the shear web 27 which lies onto the first layer of fibre material for supporting the shear web 26 is taken towards the leading edge 39 of the mould 25 whereby the top surface 23 of the shear web 10 is exposed. This back folding of the second layer of fibre material for supporting the shear web 27 is indicated by an arrow 18. A second supporting member analogous to the first supporting member 28 can then be positioned at the top surface 23 of the shear web 10. Afterwards the rest of the blade can be built, for example by means of vacuum assisted resin transfer moulding.

Generally the used fibre material can be glass fibre material or carbon fibre material. The material of the shear web 10 can comprise plastic material, for example thermoplastic material. The shear web 10 may comprise polyethylene terephthalate (PET) foam.

Figure 8:
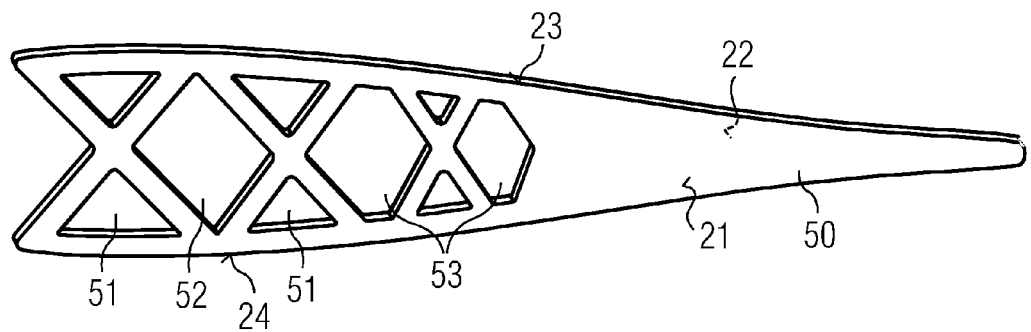
FIG. 8 schematically shows a shear web in a frontal view.
Figure 9:
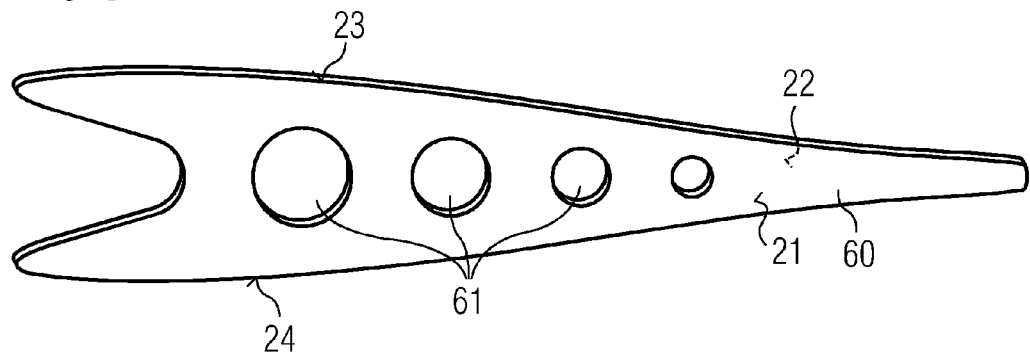
FIG. 9 schematically shows an alternative shear web in a frontal view.

FIGS. 8 and 9 show different variants of shear webs 50 and 60 in a frontal view. The shear webs 50 and 60 comprise a first surface 21, a second surface 22, a top surface 23 and a base surface 24.

The shear web 50, as shown in FIG. 8, comprises a number of holes or openings 51, 52, 53 which connect the first surface 21 and the second surface 22 with each other. Some of the holes 51 have a triangular shape. One hole 52 has a trapezoidal shape. The trapezoidal hole 52 is surrounded by four triangular holes 51. Two other holes 53 have a hexagonal shape. Between the two holes 53 with hexagonal shape two additional holes with a triangular shape are located.

FIG. 9 shows a shear web 60 with a number of holes 61 between the first surface 21 and the second surface 22. The holes 61 have a circular cross section. Providing the shear web with holes as shown in FIG. 8 and FIG. 9 reduces the weight of the shear web and thereby the weight of the wind turbine rotor blade. Generally, the holes may have any shape or cross section. The shear webs which are shown in FIG. 8 and FIG. 9 are only two of may other possible examples.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for manufacturing a wind turbine rotor blade with a shear web comprising:
    laying inner fibre material onto an inner surface of a mould,
    laying at least one first layer of fibre material for the shear web onto the inner fibre material which was placed onto the inner surface of the mould,
    positioning a first mould core part, comprising a base surface, a top surface and a surface for supporting the shear web, partly onto the at least one first layer of fibre material for the shear web,
    placing the at least one first layer of fibre material for the shear web-along the surface for supporting the shear web and at least partly along the top surface of the first mould core part,
    after the placing the at least one first layer of fibre material, positioning the shear web comprising a first surface and a second surface at the surface for supporting the shear web of the first mould core part such that the first surface of the shear web faces the at least one first layer of fibre material at the surface for supporting the shear web,
    after the positioning the shear web, laying a second layer of fibre material for the shear web onto the inner fibre material which was placed onto the inner surface of the mould, along the second surface of the shear web and at least partly along the top surface of the first mould core part,
    after the laying a second layer of fibre material, positioning a second mould core part, comprising a base surface, a top surface and a surface for supporting the shear web, partly onto the at least one second layer of fibre material for the shear web, such that the base surface is facing the second layer of fibre material for the shear web and the surface for supporting the shear web is facing towards the second surface of the shear web, and
    placing part of the second layer of fibre material for the shear web onto the top surface of the second mould core part.

2. The method as claimed in claim 1, wherein the shear web comprises plastic material.

3. The method as claimed in claim 2, wherein the shear web comprising polyethylene terephthalate (PET) foam.

4. The method as claimed in claim 1, wherein the at least one first layer of fibre material comprises glass fibre material and/or carbon fibre material.

5. The method as claimed in claim 1, further comprising connecting at least one of a base portion or a top portion of the shear web to at least one supporting member.

6. The method as claimed in claim 5, wherein the shear web comprises a base surface and a top surface and the supporting member is located at the base surface or the top surface of the shear web.

7. The method as claimed in claim 1, wherein the shear web comprises at least one opening.

8. The method as claimed in claim 7, wherein the opening has a circular cross section or a cross section with the shape of a polygon with n edges.

9. The method as claimed in claim 1, wherein a first web supporting member is positioned onto the fibre material which was placed onto the inner surface of the mould before laying the at least one first layer of fibre material for the shear web onto the fibre material which was placed onto the inner surface of the mould.

10. The method as claimed in claim 1, wherein a second web supporting member is positioned after placing part of the second layer of fibre material for the shear web onto the top surface of the second mould core part.

11. A method for manufacturing a wind turbine rotor blade with a shear web comprising:
    laying inner fibre material onto an inner surface of a mould,
    placing a first shear web supporting member on top of the inner fibre material,
    laying at least one first layer of fibre material for the shear web onto the inner fibre material which was placed onto the inner surface of the mould,
    positioning a first mould core part, comprising a base surface, a top surface and a surface for supporting the shear web, partly onto the at least one first layer of fibre material for the shear web,
    placing the at least one first layer of fibre material for the shear web along the surface for supporting the shear web and at least partly along the top surface of the first mould core part,
    positioning the shear web comprising a first surface and a second surface at the surface for supporting the shear web of the first mould core part such that the first surface of the shear web faces the at least one first layer of fibre material at the surface for supporting the shear web,
    connecting at least one of a base portion or a top portion of the shear web to at least one web supporting member,
    laying a second layer of fibre material for the shear web onto the inner fibre material which was placed onto the inner surface of the mould, along the second surface of the shear web and at least partly along the top surface of the first mould core part,
    after the laying of the second layer of fibre material, positioning a second mould core part, comprising a base surface, a top surface and a surface for supporting the shear web, partly onto the at least one second layer of fibre material for the shear web, such that the base surface is facing the second layer of fibre material for the shear web and the surface for supporting the shear web is facing towards the second surface of the shear web, and
    placing part of the second layer of fibre material for the shear web onto the top surface of the second mould core part.

12. The method of claim 11, wherein the at least one web supporting member comprises a first supporting member, and wherein the connecting comprises:
    positioning a first web supporting member onto the inner fibre material prior to laying at least one first layer of fibre material for the shear web onto the inner fibre material which was placed onto the inner surface of the mould, and
    after the positioning the shear web, connecting a base portion of the shear web to the first web supporting member.

13. The method of claim 12, wherein the at least one web supporting member further comprises a second supporting member, wherein the connecting further comprises:
    after placing part of the second layer of fibre material for the shear web onto the top surface of the second mould core part, connecting a top portion of the shear web to a second web supporting member.

14. The method of claim 11, wherein the at least one web supporting member comprises a second supporting member, and wherein the connecting comprises:
    after placing part of the second layer of fibre material for the shear web onto the top surface of the second mould core part, connecting a top portion of the shear web to the second web supporting member.

* * * * *